DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 1, 1971

827 O.G. 7

T887,013
DISSIPATION OF ATMOSPHERIC FOG

Richard E. Chaddock, 4826 Kennett Pike,
Greenville, Del. 19807

Filed Nov. 13, 1970, Ser. No. 89,515
Int. Cl. E01h *13/00*
U.S. Cl. 239—2
No Drawing. 15 Pages Specification

Disclosed is dissipation of atmospheric fog by dispersing polyelectrolytes of a defined group into the fog mass. Utilization of a beta-methacryloyloxyethyltrimethylammonium methyl sulfate (MTMMS)—acrylamide copolymer fog dispersant is now preferred. The polyelectrolytes are water-soluble polymers from the following:

(a) vinyl homopolymers containing quaternary ammonium groups, (b) vinyl polymers containing both quaternary ammonium groups and tertiary amine groups, the amount of quatrenary ammonium groups being greater than the amount of tertiary amine groups, (c) copolymers of vinyl monomers containing quaternary ammonium groups and up to 99% by weight of the total of acrylamide or acrylamide substituted on the alpha carbon atom or on the nitrogen atom, or (d) terpolymers of vinyl monomers containing quaternary ammonium groups, vinyl monomers containing tertiary amine groups, and up to 99% by weight of the total of acrylamide or acrylamide substituted on the alpha carbon atom or on the nitrogen atom, the amount of quaternary ammonium groups in the terpolymer being greater than the amount of tertiary amine groups.